US012579628B2

(12) United States Patent
Alumot et al.

(10) Patent No.:  US 12,579,628 B2
(45) Date of Patent:      Mar. 17, 2026

(54) OVERLAY MEASUREMENT BETWEEN LAYERS OF A SEMICONDUCTOR SPECIMEN BASED ON CENTER OF SYMMETRY (COS) LOCALIZATION

(71) Applicant: Applied Materials Israel Ltd., Rehovot (IL)

(72) Inventors: Dror Alumot, Tel Aviv (IL); Tal Ben-Shlomo, Givatayim (IL); Vladislav Kaplan, Raanana (IL); Yaniv Abramovitz, Mazkeret Batya (IL); Dan Tuvia Fuchs, Tel Aviv (IL); Michael Elliot Adel, Zichron Ya'akov (IL)

(73) Assignee: Applied Materials Israel Ltd., Rehovot (IL)

( * ) Notice: Subject to any disclaimer, the term of this patent is extended or adjusted under 35 U.S.C. 154(b) by 705 days.

(21) Appl. No.: 17/893,082

(22) Filed: Aug. 22, 2022

(65) Prior Publication Data

US 2024/0062355 A1      Feb. 22, 2024

(51) Int. Cl.
　　*G06T 7/00*　　　(2017.01)
　　*G06T 7/11*　　　(2017.01)
　　*G06T 7/68*　　　(2017.01)

(52) U.S. Cl.
　　CPC .............. *G06T 7/0004* (2013.01); *G06T 7/11* (2017.01); *G06T 7/68* (2017.01); *G06T 2207/30148* (2013.01)

(58) Field of Classification Search
　　CPC . G06T 7/0004; G06T 7/11; G06T 7/68; G06T 2207/30148; G06T 2207/10061; G03F 7/70633; G03F 7/70655; G03F 7/706837; H01L 22/12; H01L 22/20; G06V 10/25
　　See application file for complete search history.

(56) References Cited

U.S. PATENT DOCUMENTS

2007/0229829 A1 *  10/2007  Kandel ............... G03F 7/70633
　　　　　　　　　　　　　　　　　　　　　　　　356/401

* cited by examiner

*Primary Examiner* — Hwa Andrew Lee
(74) *Attorney, Agent, or Firm* — Lowenstein Sandler LLP

(57)　　　　　　　　ABSTRACT

There is provided a system and method of determining an overlay measurement between a first layer and a second layer of a specimen. The method includes acquiring a first image of a first structure on the first layer and a second image of a second structure on the second layer, obtaining one or more first regions of interest (ROIs) enclosing part of the first structure and one or more second ROIs enclosing part of the second structure, determining one or more first sets of symmetric sub-structures based on the first ROIs and one or more second sets of symmetric sub-structures based on the second ROIs, localizing a first center of symmetry (COS) based on a COS identified for each first set, and localizing a second COS based on a COS identified for each second set, and determining the overlay measurement based on the first COS and the second COS.

18 Claims, 7 Drawing Sheets

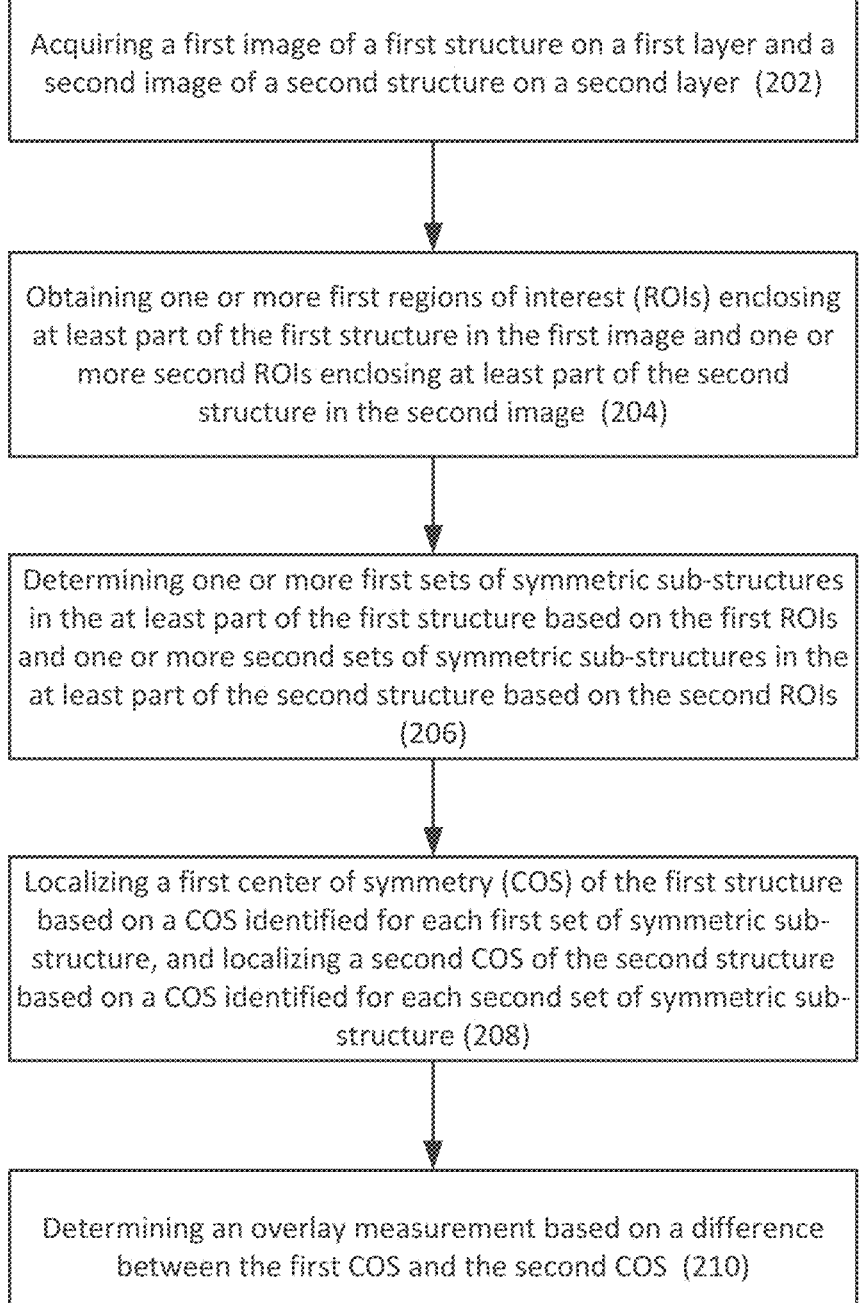

Acquiring a first image of a first structure on a first layer and a second image of a second structure on a second layer (202)

Obtaining one or more first regions of interest (ROIs) enclosing at least part of the first structure in the first image and one or more second ROIs enclosing at least part of the second structure in the second image (204)

Determining one or more first sets of symmetric sub-structures in the at least part of the first structure based on the first ROIs and one or more second sets of symmetric sub-structures in the at least part of the second structure based on the second ROIs (206)

Localizing a first center of symmetry (COS) of the first structure based on a COS identified for each first set of symmetric sub-structure, and localizing a second COS of the second structure based on a COS identified for each second set of symmetric sub-structure (208)

Determining an overlay measurement based on a difference between the first COS and the second COS (210)

FIG. 2

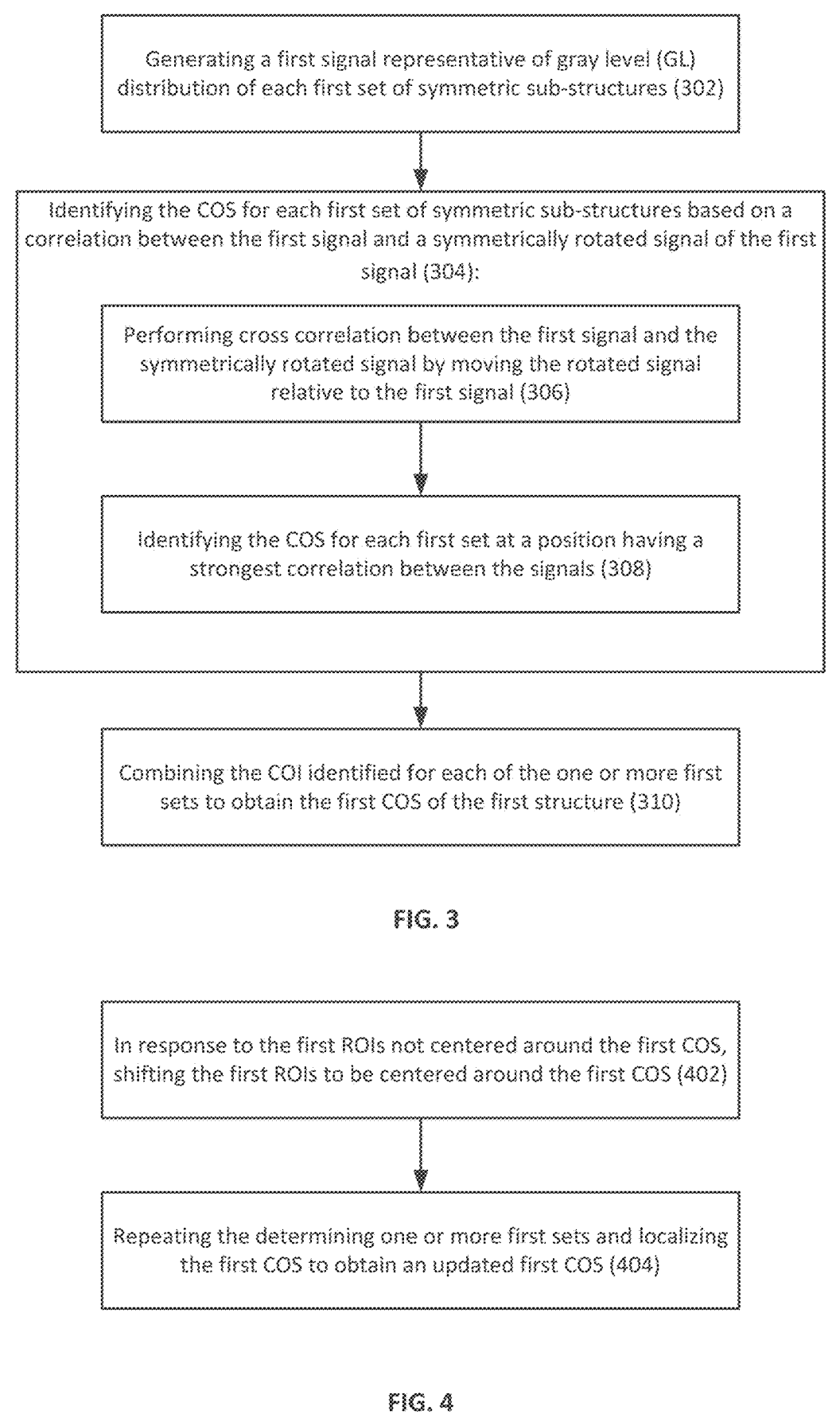

Generating a first signal representative of gray level (GL) distribution of each first set of symmetric sub-structures (302)

Identifying the COS for each first set of symmetric sub-structures based on a correlation between the first signal and a symmetrically rotated signal of the first signal (304):

Performing cross correlation between the first signal and the symmetrically rotated signal by moving the rotated signal relative to the first signal (306)

Identifying the COS for each first set at a position having a strongest correlation between the signals (308)

Combining the COI identified for each of the one or more first sets to obtain the first COS of the first structure (310)

FIG. 3

In response to the first ROIs not centered around the first COS, shifting the first ROIs to be centered around the first COS (402)

Repeating the determining one or more first sets and localizing the first COS to obtain an updated first COS (404)

FIG. 4

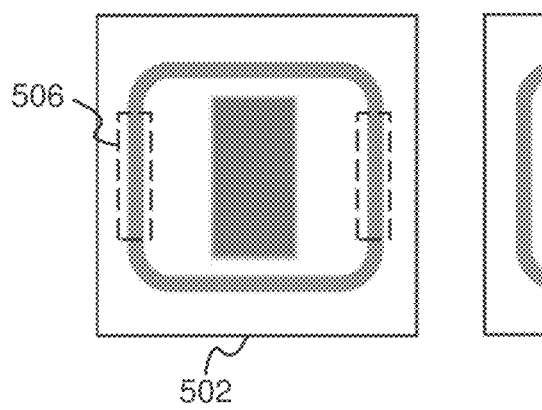
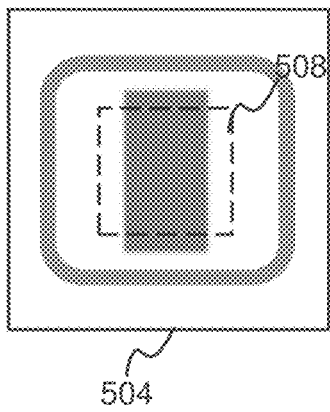
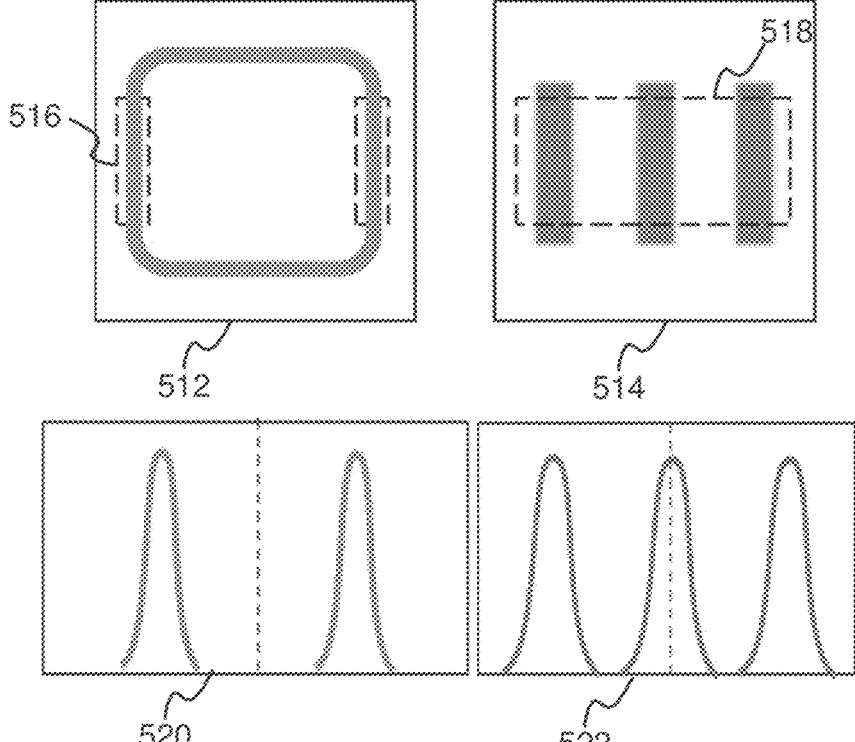
FIG. 5

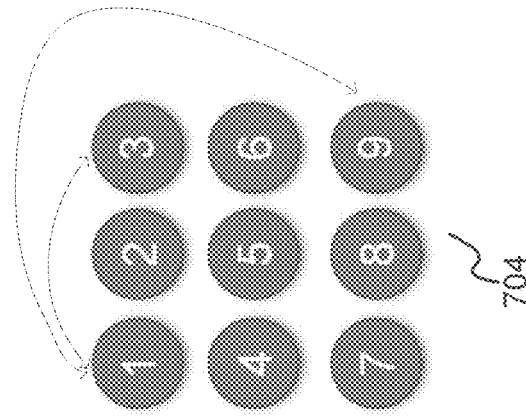
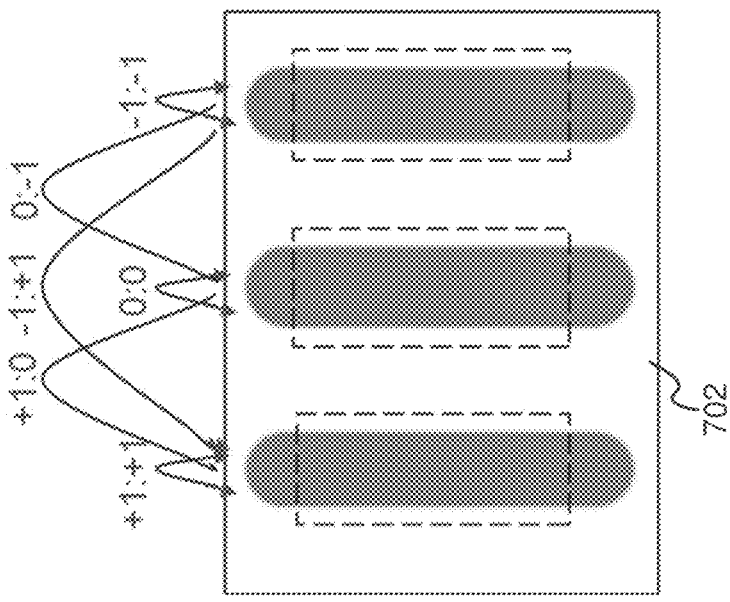
FIG. 7

OVERLAY MEASUREMENT BETWEEN LAYERS OF A SEMICONDUCTOR SPECIMEN BASED ON CENTER OF SYMMETRY (COS) LOCALIZATION

TECHNICAL FIELD

The presently disclosed subject matter relates, in general, to the field of examination of a semiconductor specimen, and more specifically, to overlay measurement on the specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication for performing metrology related operations and/or defect related operations. Effectiveness of examination can be improved by automatization of certain process(es) such as, for example, defect detection, Automatic Defect Classification (ADC), Automatic Defect Review (ADR), image segmentation, and automated metrology-related operations, etc. Automated examination systems ensure that the parts manufactured meet the quality standards expected and provide useful information on adjustments that may be needed to the manufacturing tools, equipment, and/or compositions, depending on the type of errors identified, so as to promote higher yield.

SUMMARY

In accordance with certain aspects of the presently disclosed subject matter, there is provided a computerized system of determining an overlay measurement between a first layer and a second layer of a semiconductor specimen, the system comprising a first processing and memory circuitry (PMC) configured to: acquire a first image of a first structure on the first layer and a second image of a second structure on the second layer; obtain one or more first regions of interest (ROIs) enclosing at least part of the first structure in the first image and one or more second ROIs enclosing at least part of the second structure in the second image; determine one or more first sets of symmetric sub-structures in the at least part of the first structure based on the first ROIs and one or more second sets of symmetric sub-structures in the at least part of the second structure based on the second ROIs; localize a first center of symmetry (COS) of the first structure based on a COS identified for each first set of symmetric sub-structure, and localize a second COS of the second structure based on a COS identified for each second set of symmetric sub-structure; and determine the overlay measurement based on a difference between the first COS and the second COS.

In addition to the above features, the system according to this aspect of the presently disclosed subject matter can comprise one or more of features (i) to (xvi) listed below, in any desired combination or permutation which is technically possible:

(i). The first image is the second image.

(ii). The first image and the second image are different images acquired by an electron beam tool. The first image is a secondary electron (SE) image, and the second image is a backscattered electron (BSE) image.

(iii). The first image and the second image are different images acquired by an optical metrology tool with different optical configurations.

(iv). The first ROIs and second ROIs are selected in an attempt to avoid interference between the at least part of first structure enclosed in the first ROIs and the at least part of second structure enclosed in the second ROIs, while taking into consideration expected process variations with respect to the at least part of first structure or the at least part of second structure.

(v). At least one of the one or more first sets of symmetric sub-structures or the one or more second sets of symmetric sub-structures comprises a plurality of sets of symmetric sub-structures.

(vi). The one or more first sets of symmetric sub-structures are determined based on one or more characteristics of the first ROIs including: shape, position, size and the number of the first ROIs, and a type of symmetry between the first ROIs.

(vii). The one or more second sets of symmetric sub-structures are determined based on one or more characteristics of the second ROIs including: shape, position, size and the number of the second ROIs, and a type of symmetry between the second ROIs.

(viii). In cases where the at least part of first structure comprises a plurality of sub-structures each being self-symmetric and symmetric to one another, the one or more first sets comprises multiple first sets of symmetric sub-structures, each set corresponding to a respective permutation of a pair of two sub-structures.

(ix). In cases where the at least part of second structure comprises a plurality of sub-structures each being self-symmetric and symmetric to one another, the one or more second sets comprises multiple second sets of symmetric sub-structures, each set corresponding to a respective permutation of a pair of two sub-structures.

(x). The PMC is configured to localize the first COS of the first structure by: generating a first signal representative of gray level (GL) distribution of each first set of symmetric sub-structures; identifying the COS for each first set of symmetric sub-structures based on a correlation between the first signal and a symmetrically rotated signal of the first signal; and combining the COS identified for each of the one or more first sets to obtain the first COS of the first structure.

(xi). The correlation is obtained by performing cross correlation between the first signal and the symmetrically rotated signal by moving the rotated signal relative to the first signal, and the COS for each first set is identified at a position having a strongest correlation between the first signal and the rotated signal.

(xii). The PMC is configured to localize the second COS of the second structure by: generating a second signal representative of gray level (GL) distribution of each second set of symmetric sub-structures; identifying the COS for each second set of symmetric sub-structures based on a correlation between the second signal and a symmetrically rotated signal of the second signal; and combining the COS identified for each of the one or more second sets to obtain the second COS of the second structure.

(xiii). Upon localizing the first COS, the PMC is further configured to, in response to the first ROIs not centered around the first COS, shift the first ROIs to be centered around the first COS, and repeat the determining one or more first sets and localizing the first COS to obtain an updated first COS.

(xiv). The first structure and the second structure are actual device structures or overlay targets on the semiconductor specimen.

(xv). The first structure and the second structure comprise at least one of mirror-symmetric patterns or rotation-symmetric patterns.

(xvi). The first ROIs and the second ROIs are selected by a user based on one or more reference images of the first structure and the second structure.

In accordance with other aspects of the presently disclosed subject matter, there is provided a method of determining an overlay measurement between a first layer and a second layer of a semiconductor specimen, the method comprising: acquiring a first image of a first structure on the first layer and a second image of a second structure on the second layer; obtaining one or more first regions of interest (ROIs) enclosing at least part of the first structure in the first image and one or more second ROIs enclosing at least part of the second structure in the second image; determining one or more first sets of symmetric sub-structures in the at least part of the first structure based on the first ROIs and one or more second sets of symmetric sub-structures in the at least part of the second structure based on the second ROIs; localizing a first center of symmetry (COS) of the first structure based on a COS identified for each first set of symmetric sub-structure, and localizing a second COS of the second structure based on a COS identified for each second set of symmetric sub-structure; and determining the overlay measurement based on a difference between the first COS and the second COS.

This aspect of the disclosed subject matter can comprise one or more of features (i) to (xvi) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of a method of determining an overlay measurement between a first layer and a second layer of a semiconductor specimen, the method comprising: acquiring a first image of a first structure on the first layer and a second image of a second structure on the second layer; obtaining one or more first regions of interest (ROIs) enclosing at least part of the first structure in the first image and one or more second ROIs enclosing at least part of the second structure in the second image; determining one or more first sets of symmetric sub-structures in the at least part of the first structure based on the first ROIs and one or more second sets of symmetric sub-structures in the at least part of the second structure based on the second ROIs; localizing a first center of symmetry (COS) of the first structure based on a COS identified for each first set of symmetric sub-structure, and localizing a second COS of the second structure based on a COS identified for each second set of symmetric sub-structure; and determining the overlay measurement based on a difference between the first COS and the second COS.

This aspect of the disclosed subject matter can comprise one or more of features (i) to (xvi) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 2 illustrates a generalized flowchart of determining an overlay measurement between a first layer and a second layer of a semiconductor specimen in accordance with certain embodiments of the presently disclosed subject matter.

FIG. 3 illustrates a generalized flowchart of localizing the first COS of the first structure in accordance with certain embodiments of the presently disclosed subject matter.

FIG. 4 illustrates a generalized flowchart of refining the identified COS in accordance with certain embodiments of the presently disclosed subject matter.

FIG. 5 illustrates exemplified structures and ROIs defined thereupon in accordance with certain embodiments of the presently disclosed subject matter.

FIG. 7 illustrates examples of deriving multiple sets of sub-symmetry in accordance with certain embodiments of the presently disclosed subject matter.

DETAILED DESCRIPTION OF EMBODIMENTS

Figure 1:
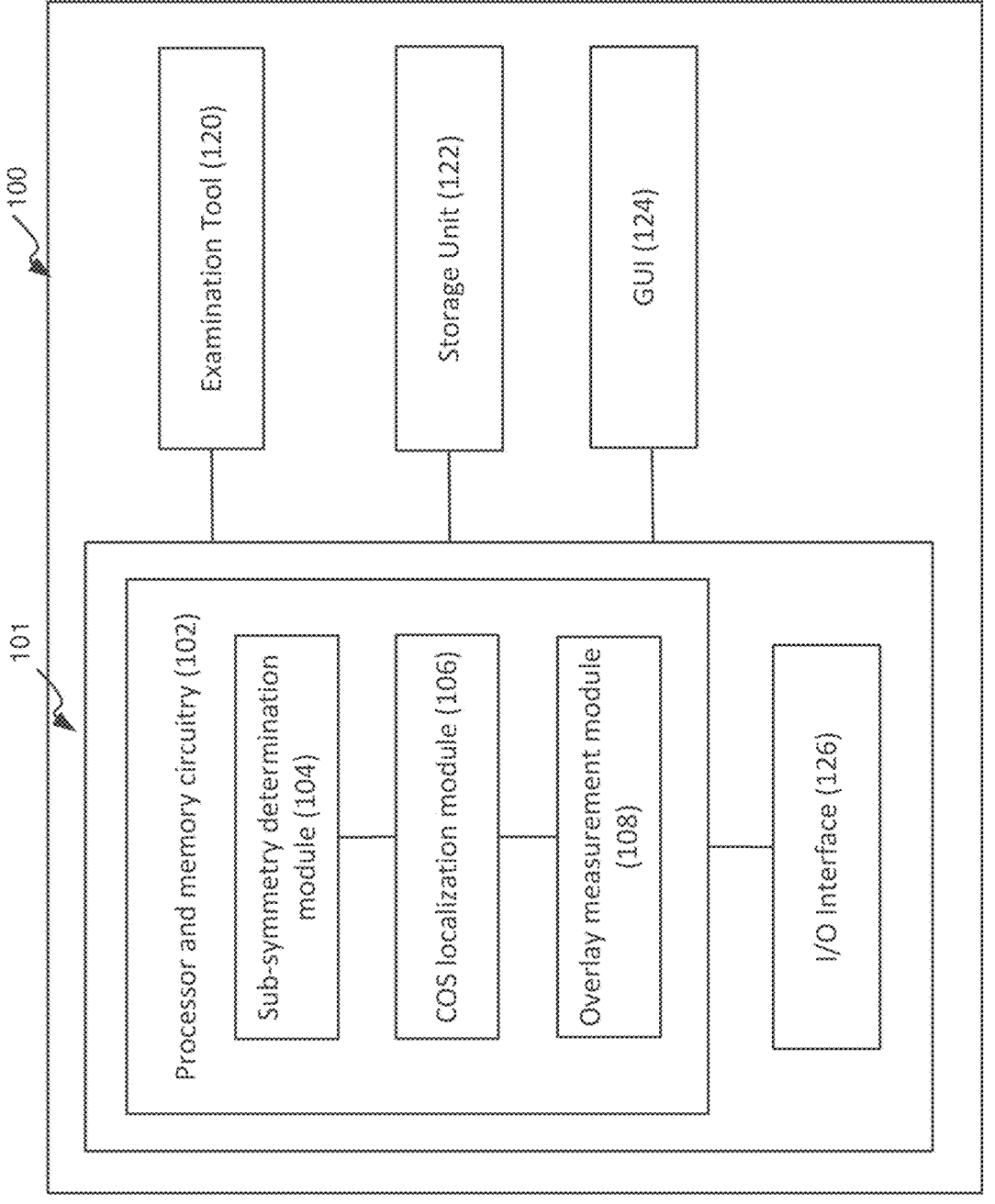
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "acquiring", "determining", "localizing", "generating", "identifying", "combining", "performing", "shifting", "selecting", "repeating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the metrology system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification, segmentation, and/or metrology operations, such as, e.g., critical dimension (CD) measurements, overlay, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning (in a single or in multiple scans), imaging, sampling, reviewing, measuring, classifying and/or other processes provided with regard to the specimen or parts thereof.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

In some embodiments, at least one of the examination tools 120 has metrology capabilities and can be configured to capture images and perform metrology operations on the captured images. Such an examination tool is also referred to herein as a metrology tool.

According to certain embodiments, the metrology tool can be an electron beam tool, such as, e.g., scanning electron microscopy (SEM). SEM is a type of electron microscope that produces images of a specimen by scanning the specimen with a focused beam of electrons. The electrons interact with atoms in the specimen, producing various signals that contain information on the surface topography and/or composition of the specimen. SEM is capable of accurately measuring features during the manufacture of semiconductor wafers. By way of example, the metrology tool can be critical dimension scanning electron microscopes (CD-SEM) configured to perform metrology operations with respect to of structural features of a specimen based on the captured images. In some other embodiments, the metrology tool can be an optical tool.

It is to be noted that, the term "image(s)" used herein can refer to original images of the specimen captured by the examination tool during the manufacturing process, derivatives of the captured images obtained by various pre-processing stages, and/or computer-generated design data-based images. It is to be noted that in some cases the images referred to herein can include image data (e.g., captured images, processed images, etc.) and associated numeric data (e.g., metadata, hand-crafted attributes, etc.). It is further noted that image data can include data related to one or more layers of interest of the specimen.

The process of semiconductor manufacturing often requires fabricating a series of layers, at least some of which comprise various structural features (also referred to as structures or features) manufactured by one or more processing steps (also referred to as process steps). Metrology operations can be performed at various processing steps during the manufacturing process to monitor and control the process. By way of example, in some cases, there is a need to control alignment between various layers or within particular layers of a specimen, as the relative position of certain structural features in various layers can be critical to the device performance.

The misalignment between structural features on different layers of a specimen is referred to as overlay, or overlay error, which must be well measured such that the performance of the relevant processing steps can be controlled based on the measurements. For instance, if certain overlay measurements of the specimen are unacceptable (e.g., exceeding a predetermined tolerance range or threshold), such measurements may be used to alter one or more parameters of the processing steps such that subsequent specimens manufactured by the processing steps can have acceptable overlay characteristics.

Presently, in some cases, the overlay error can be measured based on image segmentation which delivers critical information on the shapes and dimensions of the structural features in the images. For instance, the images of different layers can be segmented for purpose of identifying the edges of the structural features thereof, and an overlay measurement can be derived based on the relative positions of the identified edges. In such cases, the quality of the overlay measurement largely depends on the performance of the image segmentation which is known to be a challenging task by itself due to various affecting factors in different methodologies. For instance, in a derivative-based image segmentation, the edges of the structures are determined based on the locations in the image signal that have the largest derivatives. Such an approach relies on very limited image information, and the outcome tends to be less reliable. Alternatively, in a machine-learning based image segmentation, the quality of segmentation may be affected by various factors such as the amount and/or quality of the training data, the architecture of segmentation network(s) used, the training process thereof etc.

Alternatively, certain present techniques use overlay targets for obtaining overlay measurements. Overlay targets refer to reference patterns which are manufactured together with the actual device patterns on certain layers of a specimen. Such overlay targets are generally designed to contain specific structures with relatively large sizes (relative to the sizes of the actual device patterns) to be printed at specific locations on different layers, thus enabling the measurement of the relative position therebetween. The images of the overlay targets are acquired during the inspection of the actual device patterns on the layers which are used for deriving the overlay measurement. However, such an approach requires to physically print the targets having a typically complex design on the actual devices. In addition, it is an indirect measurement of overlay, and in some cases it may be difficult to prove the correlation of the overlay measurement obtained based on the targets with respect to the target overlay measurement of the actual device features.

Accordingly, certain embodiments of the presently disclosed subject matter propose a metrology system capable of obtaining overlay measurements on actual device features with improved measurement performance (e.g., in terms of measurement stability, accuracy, total measurement uncertainty (TMU), etc.), as will be detailed below.

According to certain embodiments of the presently disclosed subject matter, the examination system 100 comprises a computer-based system 101 operatively connected to the examination tools 120 and capable of determining an overlay measurement between a first layer and a second layer of a semiconductor specimen based on runtime images obtained by the examination tool 120 during specimen fabrication. System 101 is also referred to as a metrology system or an overlay measurement system.

Specifically, system 101 includes a first processor and memory circuitry (PMC) 102 operatively connected to a hardware-based I/O interface 126. The first PMC 102 is configured to provide processing necessary for operating the system as further detailed with reference to FIGS. 2, 3 and 4 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

Functional modules comprised in the first PMC 102 of system 101 can include a sub-symmetry determination module 104, a center of symmetry (COS) localization module 106 and an overlay measurement module 108. The PMC 102 can be configured to acquire/obtain, via the I/O interface 126 and from the examination tool 120 (e.g., a metrology tool), a first image of a first structure on the first layer of the specimen and a second image of a second structure on the second layer of the specimen as captured by the tool 120. The first structure and the second structure can comprise symmetric patterns.

The sub-symmetry determination module 104 can be configured to obtain one or more first regions of interest (ROIs) enclosing at least part of the first structure in the first image and one or more second ROIs enclosing at least part of the second structure in the second image. The sub-symmetry determination module 104 can be further configured to determine one or more first sets of symmetric sub-structures in the at least part of the first structure based on the first ROIs and one or more second sets of symmetric sub-structures in the at least part of the second structure based on the second ROIs.

The COS localization module 106 can be configured to localize a first center of symmetry (COS) of the first structure based on a COS identified for each first set of symmetric sub-structures, and localize a second COS of the second structure based on a COS identified for each second set of symmetric sub-structures. The overlay measurement module 108 can be configured to determine the overlay measurement based on the difference between the first COS and the second COS.

Operation of systems 100, 101 and the PMC 102, as well as the functional modules therein, will be further detailed with reference to FIGS. 2-4.

In some cases, additionally to system 101, the examination system 100 can comprise one or more examination modules, such as, e.g., defect detection module and/or Automatic Defect Review Module (ADR) and/or Automatic Defect Classification Module (ADC) and/or an additional metrology-related module and/or other examination modules which are usable for examination of a semiconductor specimen. The one or more examination modules can be implemented as stand-alone computers, or their functionalities (or at least part thereof) can be integrated with the examination tool 120. In some cases, the output of system 101 can be provided to the one or more examination modules for further processing.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120. Accordingly, the images can be retrieved from the storage unit 122 and provided to the PMC 102 for further processing. The output of the system 101, such as the overlay measurement, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters, such as, e.g., the first ROIs, the second ROIs, etc. The user may also view the operation results, such as, e.g., the overlay measurement, on the GUI. In some cases, system 101 can be further configured to send, via I/O interface 126, the output data to one or more of the examination tools 120 for further processing. In some cases, system 101 can be further configured to send certain output data to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. For instance, the examination tool 120 and the system 101 can be located at the same entity (in some cases hosted by the same device) or distributed over different entities.

It is further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis as various embodiments of the systems 101 and 100, and vice versa.

Referring to FIG. 2, there is illustrated a generalized flowchart of determining an overlay measurement between a first layer and a second layer of a semiconductor specimen in accordance with certain embodiments of the presently disclosed subject matter.

As described above, a semiconductor device/specimen is manufactured in a fabrication process (also termed herein as manufacturing process) where a sequence of processing steps is carried out during which electronic circuits are gradually created on a wafer. Specifically, a specimen typically comprises multiple layers, each comprising structural features manufactured by a plurality of processing steps. A structural feature can refer to an element or module to be manufactured on a layer that has a specific designed structure and functionality. By way of example, the plurality of processing steps for manufacturing a structural feature in a layer can include one or more of the following: lithography, etching, filling, depositing, polishing, recessing, planarization, growth, and implantation, etc.

According to certain embodiments of the presently disclosed subject matter, a first image of a first structure on a first layer and a second image of a second structure on a second layer of a specimen can be acquired (202) (e.g., by the PMC 102 via the I/O interface 126). The first structure and the second structure can comprise symmetric patterns. By way of example, the first structure and the second structure can comprise mirror-symmetric patterns and/or rotation-symmetric patterns, as will be exemplified below.

In some cases, the first layer and the second layer can refer to two successive physical layers of the semiconductor specimen. The first structure on the first layer and the second structure on the second layer can refer to two structural features formed successively on the two layers with expected relative positions. In some other cases, the first layer and the second layer can refer to two processing steps within the same physical layer. The first structure on the first layer and the second structure on the second layer can refer to two structures (as part of a structural feature) formed on the same layer via two or more different processing steps (also referred to as multi-patterning).

The first image and the second image can be acquired by a metrology tool (e.g., one of the examination tools 120). As mentioned above, the images can result from different examination modality(s), such as, e.g., by an optical inspection tool, an electron beam tool, etc., and the present disclosure is not limited by the specific examination modality used for acquiring the image.

In some embodiments, the first image and the second image can be the same image. For instance, one image acquired by a metrology tool may be representative of both the first structure and the second structure. In some other embodiments, the first image and the second image can be different images. By way of example, the first image and the second image can be two different images acquired by an electron beam tool, such as a SEM tool. The SEM tool used herein can be, e.g., critical dimension scanning electron microscopes (CD-SEM) configured to perform metrology operations with respect to structural features of a specimen based on the captured images. In one example, the first image can be a secondary electron (SE) image, and the second image can be a backscattered electron (BSE) image, as described below in further detail.

In an SEM, when an electron beam strikes a specimen, different types of signals are generated. Secondary electrons (SEs) originate from the surface or the near-surface regions of the specimen. They are a result of inelastic interactions between the primary electron beam and the specimen, and have lower energy than the backscattered electrons. Specifically, SEs are produced when an incident electron excites an electron in the specimen and loses some of its energy in the process. The excited electron moves towards the surface of the specimen and, if it still has sufficient energy, it escapes from the surface as a secondary electron. The shallow depth of production of detected SEs makes them ideal for examining topography of the specimen's surface.

Additionally, backscattered electrons (BSEs) are reflected back after elastic interactions between the beam and the specimen. This type of electrons originates from a broad region within the interaction volume. They are a result of elastic collisions of electrons with atoms, which result in a change in the electrons' trajectory. Specifically, when the electron beam strikes the specimen, some of the electrons are deflected from their original path by atoms in the specimen in an elastic fashion (no loss of energy). These essentially elastically scattered primary electrons (which are high-energy electrons) that rebound from the sample, are referred to as BSEs.

As described, BSEs come from deeper regions of the sample, while SEs originate from surface regions. Therefore, BSEs and SEs carry different types of information. For instance, BSE images show high sensitivity to differences in atomic number, therefore can carry information on the specimen's interior structure and/or composition (i.e., this is referred to as the see-through ability of the BSEs to probe the specimen in depth when provided with enough landing energy), whereas SE images can provide more detailed surface information.

Continuing with the above example, assume the first layer is an upper layer manufactured on top of the second layer which is a lower layer (in other cases it could be the other way around). The first image can be a SE image acquired based on the collected SE signals representative of the upper layer structure, and the second image can be a BSE image acquired based on the collected BSE signals representative of the lower layer structure. The SE image and the BSE image are acquired simultaneously by respective detectors of the SEM tool.

By way of another example, the first image and the second image can be different images acquired by an optical inspection tool with different optical configurations, such as, e.g., different focal points and/or wavelengths, etc. In some cases, the two images can be acquired by different examination modalities. For instance, one of the two images can be acquired by an SEM, while the other is acquired by an optical tool.

One or more first region of interest (ROIs) can be obtained (204) (e.g., by the sub-symmetry determination module 104 in the first PMC 102) enclosing at least part of the first structure in the first image, and one or more second ROIs can be obtained (204) enclosing at least part of the second structure in the second image. ROIs are defined for the purpose of identifying center of symmetry (COS) of the respective structures with respect to the defined regions. By way of example, the first ROIs and second ROIs can be selected in an attempt to separate between the at least part of first structure enclosed in the first ROIs and the at least part of second structure enclosed in the second ROIs. This is for the purpose of separating signals representing different structures from different layers to avoid interference when identifying the COS. In some cases, the first ROIs and second ROIs can be selected manually by a user. Alternatively, they can be selected automatically with an option to be further verified/adjusted by a user.

Turning now to FIG. 5, there are illustrated exemplified structures and ROIs defined thereupon in accordance with certain embodiments of the presently disclosed subject matter.

In the first example, a first image 502 and a second image 504 of a specimen are acquired. In this specific example, both images capture the two structures of two layers: an outer square and an inner square. This may occur due to various reasons, such as, e.g., the materials and thickness of the specific layers, the examination modality of the metrology tool, etc. For instance, the two images may be acquired by an optical tool with different wavelengths. In another example, the two images may be acquired by an SEM, but the materials/thickness of the layers made it not possible to separate the two layers by the SE and BSE signals.

In such cases, two first ROIs 506 can be defined on the first image 502. A second ROI 508 can be defined on the second image 504. The ROIs 506 and ROI 508 are specifically selected such that they each encloses part of a respective structure and there is no interference of the other structure in the ROIs. For instance, the two ROIs 506 only enclose parts of the outer square, while the ROI 508 only encloses part of the inner square. In comparison, assuming a relatively large first ROI is selected across the first image covering both first ROIs 506, it would unavoidably cover part of the inner square, therefore making it impossible to separate the signals representing the two structures. In addition, the ROIs are selected such that the structures enclosed therein are symmetric relative to the ROIs.

In another example, a first image 512 and a second image 514 of a specimen are acquired. The two images respectively capture two structures of two layers, namely, the first image 512 captures an outer square, and the second image 514 captures three inner lines. The two images can be acquired by an SEM as a SE image representing an upper layer structure and a BSE image representing a lower layer structure. In this present example, there is a clear separation of the two layers by the SE and BSE signals. Therefore, the selection of first ROIs and second ROIs do not necessarily need to consider signal separation. As illustrated, two first ROIs 516 are defined on the first image 512. In the second image 514, a relatively large second ROI 518 is defined across the three lines. Although the second ROI has an overlapping area with respect to the first ROIs, since the two images do not include interfering signals from the other layer, there is no interference between the signals in the selected ROIs.

The structures can be projected in 1D or 2D, based on dimensionality of the structure information enclosed in the ROI. By way of example, the two structures as illustrated in images 512 and 514 can be regarded as comprising mirror-symmetric patterns. As the structure information enclosed in the ROIs indicates a singular dimensionality, i.e., the enclosed structures are uniform along the Y axis, a 1D projection can be used to extract the representative signal thereof. For instance, a gray level (GL) waveform signal 520 is extracted for the part of the first structure enclosed in the first ROIs 516 along the X direction, e.g., by averaging the GL values within the first ROIs along the Y direction. Similarly, a GL waveform signal 522 is extracted for the part of the second structure enclosed in the second ROIs 518 along the X direction, e.g., by averaging the GL values within the second ROIs along the Y direction. As shown from the waveform signal 520 and the waveform 522, the enclosed structures in the first ROIs and the second ROIs are both symmetric (relative to the central dashed line representative of the axis of symmetry).

Once the ROIs are defined, in some cases, typically, a first center of symmetry (COS) of the first structure can be identified based on the first ROIs, and a second COS of the second structure can be identified based on the second ROIs. The overlay measurement can be determined based on the difference between the first COS and the second COS.

As described above, the first structure on the first layer and the second structure on the second layer are formed successively on the two layers with an expected relative position. When an overlay is present, the COS of the first structure on the first layer is typically shifted from the COS of a second layer of structures with respect to the expected relative positions. This shift is referred to as the overlay error or overlay measurement. Thus, the COSs of the two structures from the two layers can be measured and compared to determine whether there is an overlay error. For instance, if the shift between the two COSs does not match a known offset corresponding to the expected relative position, the amount of variance from the offset corresponds to the overlay error.

In some cases, due to process variations which have occurred during the manufacturing process, a symmetric structure as designed may appear to be not entirely symmetric when forming on the wafer. As exemplified in FIG. 6, a layer with three line structures is illustrated in 602. When the line structures are printed exactly as designed, they form a symmetric pattern (e.g., mirror-symmetric pattern) with the COS in the center of the middle line. In cases of process variation, for instance, the two lines located on the left and right may slightly shift to the right relative to the middle line, as exemplified in 604. In such cases, the left and right lines will have a different COS with respect to the COS of the middle line. When localizing the COS of the entire structure, e.g., based on correlation of the original structure and a flipped structure (as a symmetric form of the original structure), there may be interference between the two potential COSs, thus causing instability of the correlation results and the identified COS for the entire structure.

In order to address the above potential challenges, certain embodiments of the present disclosure propose to optimize the identification of COS by first identifying the number of sets of sub-symmetry (i.e., symmetric sub-structures) in the structures enclosed by the ROIs, and separately localizing a COS for each set of sub-symmetry. The final COS of the entire structures can be derived based on the COS of each set. The proposed optimization can result in a COS with improved stability and accuracy.

Figure 6:
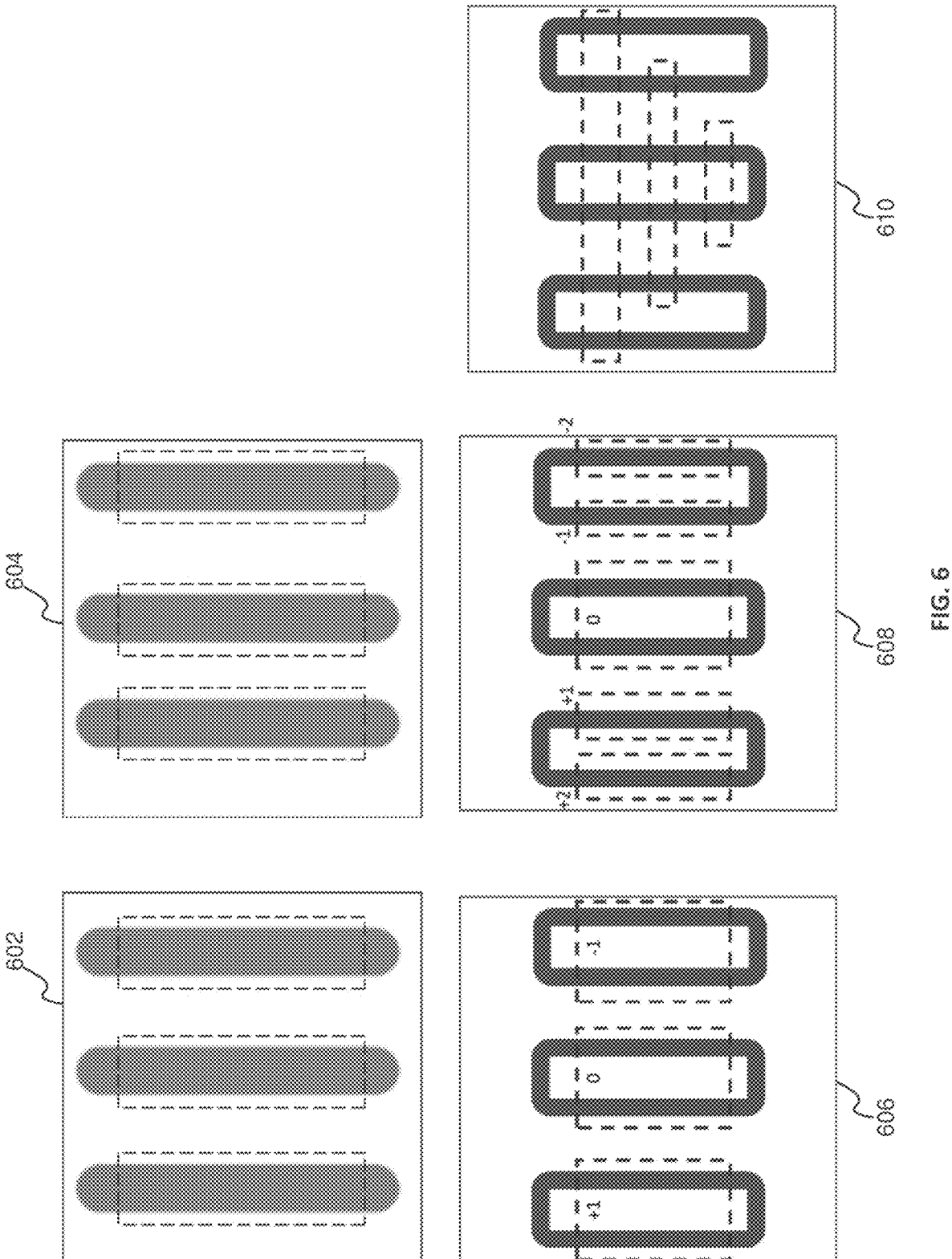
FIG. 6 illustrates various ways to derive different sets of sub-symmetry in the exemplified structures in accordance with certain embodiments of the presently disclosed subject matter.

Continuing with the example in FIG. 6, there are now illustrated various ways to derive different sets of sub-symmetry in the exemplified structures in accordance with certain embodiments of the presently disclosed subject matter. In the example of 606, three ROIs (marked by dashed lines) are respectively defined on the three line structures. The three ROIs are each assigned with a respective order: the ROI enclosing the middle line with order 0, the ROI enclosing the left line with order +1, and the ROI enclosing the right line with order −1. Two sets of sub-symmetry can be identified: the ROI enclosing the middle line by itself (order 0), and the ROIs enclosing the left line and right line (order +1 and order −1) which are symmetric one to the other.

Alternatively, in the example of 608, five ROIs (marked by dashed lines) can be defined on the three line structures.

Specifically, for each of the left line and right line, two ROIs are defined each enclosing part of the edge of the line structure. The five ROIs are respectively assigned with the following orders: the ROI enclosing the middle line with order 0, the ROIs enclosing the two edges of the left line with orders +1 and +2, and the ROIs enclosing the two edges of the right line with orders –1 and –2. Three sets of sub-symmetry can be identified: the ROI enclosing the middle line by itself (order 0), the ROIs enclosing the inner edges of the left line and right line (order +1 and order –1) which are symmetric one to the other, and the ROIs enclosing the outer edges of the left line and right line (order +2 and order –2) which are symmetric one to the other.

In yet another example 610, three ROIs (marked by dashed lines) are defined on the three line structures, differently from the example of 606. In this example, each ROI covers a different range with respect to the three structures and is symmetric by itself. Thus, each ROI can be regarded as a set of sub-symmetry by itself. In the present example, the COS of each ROI is representative of the COS of the entire structure.

As exemplified in FIG. 6, the determination of various sets of sub-symmetry depends on one or more characteristics of the defined ROIs, such as, e.g., the shape, size and position of the ROIs, the number of ROIs, as well as the type of symmetry (e.g., mirror-symmetric, or rotation-symmetric) between the ROIs.

The definition/selection of ROIs, as described above, can be determined for the purpose of separating signals representing structures of different layers and avoiding interference therebetween. In addition, the definition of ROIs for a specific structure on a layer may vary (as exemplified in 606-610 in FIG. 6) based on certain factors such as, e.g., expected process variations with respect to the part of the first/second structure as enclosed in the first/second ROIs, etc. For instance, the selection of five ROIs in the example of 608 instead of three ROIs, as illustrated in the example of 606, can be due to possible differences between the left and right edges (such as marked by orders of +1, +2 and –1, –2) of the two outer sub-structures arising from process variations, imaging artifacts, edge-of-image aberrations, etc. The selection of the three ROIs in the example of 610, instead of the three ROIs as illustrated in the example of 606, can be due to various instabilities in the outer edges of the outer sub-structures, which may be caused, e.g., by certain effects of surrounding features (not illustrated in the figure) and are better avoided when calculating the COS.

It is to be noted that the various examples of defining ROIs and different sets of sub-symmetry in FIG. 6 are for the purpose of illustration only, and should not be construed as limiting the present disclosure in any way. Any other suitable definitions can be applied in addition to or in lieu of the above.

Referring back to FIG. 2, in accordance with the above proposed optimization for the identification of COS, one or more first sets of symmetric sub-structures in the at least part of the first structure (enclosed by the first ROIs) can be determined (206) (e.g., by the sub-symmetry determination module 104 in the PMC 102) based on the first ROIs. One or more second sets of symmetric sub-structures in the at least part of the second structure (enclosed by the second ROIs) can be determined (206) based on the second ROIs.

A first COS of the first structure can be localized (208) (e.g., by the COS localization module 106 in the PMC 102) based on a COS identified for each first set of symmetric sub-structures. A second COS of the second structure can be localized (208) based on a COS identified for each second set of symmetric sub-structures. An overlay measurement can be determined (210) (e.g., by the overlay measurement module 108 in the PMC 102) based on a difference between the first COS and the second COS. Various techniques can be used to localize the COS for each set of sub-symmetry, such as, e.g., signal correlation techniques, etc.

FIG. 3 illustrates a generalized flowchart of localizing the first COS of the first structure in accordance with certain embodiments of the presently disclosed subject matter.

A first signal can be generated (302) representative of gray level (GL) distribution of each first set of symmetric sub-structures. The COS for each first set of symmetric sub-structures can be identified (304) based on a correlation between the first signal and a symmetrically rotated signal of the first signal. In cases where the first signal is representative of a set of 1D or 2D mirror-symmetric sub-structures, the symmetrically rotated signal refers to a flipped signal (flipped along the central line of the ROI(s)) of the first signal. In cases where the first signal is representative of a rotation-symmetric sub-structures, the symmetrically rotated signal refers to a 180-degree rotated signal of the first signal (rotated around the central point of the ROI(s)).

Specifically, the identification of COS for each first set of symmetric sub-structures can comprise performing (306) cross correlation between the first signal and the symmetrically rotated signal by moving the rotated signal relative to the first signal, and identifying (308) the COS for each first set at a position having the strongest correlation between the rotated signal and the first signal. The COS identified for each of the one or more first sets can be combined (310) to obtain the first COS of the first structure.

Similarly, the second COS of the second structure can be localized in a similar manner as described above with respect to the localization of the first COS. Specifically, a second signal can be generated representative of GL distribution of each second set of symmetric sub-structures. The COS for each second set of symmetric sub-structures can be identified based on a correlation between the second signal and a symmetrically rotated signal of the second signal. The identification of COS for each second set of symmetric sub-structures can comprise performing cross correlation between the second signal and the symmetrically rotated signal by moving the rotated signal relative to the second signal, and identifying the COS for each second set at a position having the strongest correlation between the rotated signal and the second signal. The COS identified for each of the one or more second sets can be combined to obtain the second COS of the second structure.

Figure 8:
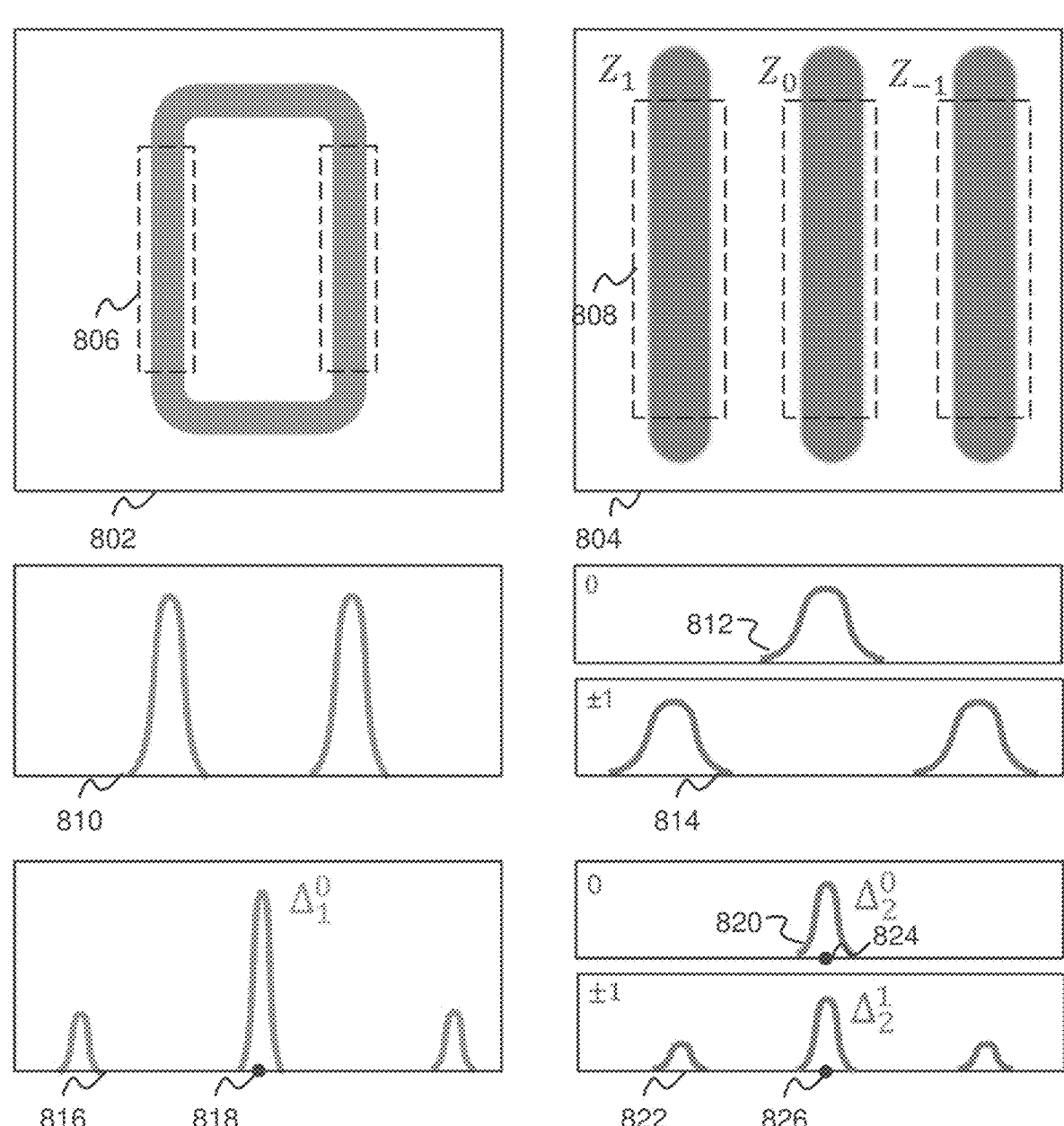
FIG. 8 illustrates an example of identifying the COS for each of one or more first and second sets of symmetric sub-structures in accordance with certain embodiments of the presently disclosed subject matter.

FIG. 8 illustrates an example of identifying the COS for each of one or more first and second sets of symmetric sub-structures in accordance with certain embodiments of the presently disclosed subject matter.

Similar to the previous examples, a first image 802 and a second image 804 respectively capturing two structures of two layers are acquired. Namely, the first image 802 captures a square structure, and the second image 804 captures three line structures. As illustrated, two first ROIs 806 are defined on the square structure of the first image 802, and three second ROI 808 are defined on the three line structures of the second image 804. It is to be noted that although, in this present example, there is a separation of the two layer structures in the two images, the first and second ROIs are still selected to avoid any possible interference between the signals from different layers in the selected ROIs (i.e., the enclosed structures in the first ROIs and second ROIs are not overlapped).

In accordance with the proposed optimization of COS identification, it is needed to determine the number of sets of sub-symmetry (i.e., symmetric sub-structures) in the structures enclosed by the ROIs, and separately localize a COS for each set of sub-symmetry.

By way of example, the two first ROIs 806 can form one set of symmetric sub-structures (as they are symmetric one to the other). Regarding the three second ROIs 808, two sets of sub-symmetry can be determined: the ROI enclosing the middle line by itself (order 0), and the ROIs enclosing the left line and right line (order +1 and order −1) which are symmetric one to the other, as similarly defined in the example of 606 in FIG. 6. It is to be noted that other ways of defining different sets of symmetric sub-structures for the second ROIs, such as exemplified in the examples of 608 and 610, can be applied alternatively.

A GL waveform signal 810 is extracted for the structures enclosed in the first ROIs 806 along the X direction, e.g., by averaging the GL values within the first ROIs along the Y direction. For the two sets of sub-symmetry in the second image, two GL waveform signals can be respectively extracted. As illustrated, a GL waveform signal 812 is extracted for the line structure enclosed in the middle ROI (order 0) along the X direction, and another GL waveform signal 814 is extracted for the line structures enclosed in the left line and right ROIs (order +1 and order −1) along the X direction.

A COS can be identified for each set of symmetric sub-structures, e.g., based on a correlation between the waveform signal and a symmetrically rotated signal thereof. For instance, as the enclosed structure in the first ROIs 806 is mirror-symmetric, a flipped signal of the signal 810 can be used to move along the X axis and a correlation of the two signals can be derived (e.g., as cross-correlation of the two signals), as illustrated in the correlation graph 816. The position 818 on the X axis where the peak correlation is identified corresponds to a shift between the signal for the enclosed structure in the first ROIs 806 and its flipped counterpart. For instance, the position 818 on the X axis represents a shift $\Delta_1$ that the flipped signal moved relative to the original signal, which is twice of the actual shift of the COS. Therefore, the COS $\delta_1$ of the first ROIs can be derived as: $\delta_1=\Delta_1/2$.

Similarly, for the two waveform signals 812 and 814 corresponding to the two sets of sub-symmetry in the second image, two correlation graphs 820 and 822 can be respectively derived in a similar manner. The positions 824 and 826 on the X axis where the peak correlations are identified respectively correspond to the two COSs for the two sets of symmetric sub-structures. Similarly, the two COSs $\delta_2^0$ (for the ROI of order 0) and $\delta_2^1$ (for the ROIs of orders +1 and −1) of the two sets can be derived as: $\delta_2^0=\Delta_2^0/2$, $\delta_2^1=\Delta_2^1/2$.

As there is only one set of symmetric sub-structures in the first image, the COS $\delta_1$ corresponding to the identified position 818 is the COS for the square structure. For the second image, the final COS of the entire structures can be derived based on the COS of each set. For instance, the final COS $\delta_2$ of the three line structures can be derived by combining (e.g., averaging) the two COSs corresponding to the two positions 824 and 826 as: $\delta_2=(\delta_2^0+\delta_2^1)/2$.

In the example of FIG. 8, in cases where there are process variations such as exemplified in the example of 604, if the three second ROIs were not split into two sets of sub-symmetry, there may appear instability when trying to identify the COS for the respective structures of the two layers. For instance, in some cases, there may appear two peak correlations in the correlation graph instead of one peak, due to the noises caused by the process variation, which may affect the accuracy of the identified COS. By determining and using different sets of symmetric sub-structures in such cases, the stability and accuracy of the COS as identified can be improved.

Once the COSs for the two structures of the two layers are identified, the overlay measurement can be determined. By way of example, the overlay measurement between the first layer and the second layer $OVL_{12}$ can be derived as: $OVL_{12}=\delta_2-\delta_1$.

In some embodiments, in cases where the sub-structures enclosed in the first ROIs and/or in the second ROIs are each self-symmetric and also symmetric to one another, multiple sets of sub-symmetry can be formed, each set corresponding to a respective permutation of a pair of two sub-structures. The possible permutations of pairs of two sub-structures can include, e.g., a pair of a sub-structure with respect to itself, as it is self-symmetric, and a pair of any two sub-structures that are symmetric one to the other according to the type of symmetry. FIG. 7 illustrates examples of deriving multiple sets of sub-symmetry in accordance with certain embodiments of the presently disclosed subject matter.

In comparison to the example of 606 where three ROIs are defined on the three line structures, and two sets of sub-symmetry are identified including the middle ROI by itself (order 0) and the left and right ROIs (orders +1 and −1), the example 702 defines the same three ROIs as in 606, while deriving six sets of sub-symmetry out of the three ROIs. Specifically, in this example, the sub-structure enclosed in each ROI is self-symmetric, and they are also symmetric to one another. Therefore, each sub-structure by itself can form a set of sub-symmetry. Any pair of two sub-structures can also form a set of sub-symmetry. Specifically, six sets of sub-symmetry can be derived, including: the left ROI by itself (order +1), the middle ROI by itself (order 0), the right ROI by itself (order −1), the left and middle ROIs (orders +1 and 0), the left and right ROIs (orders +1 and −1), and the middle and right ROIs (orders 0 and −1), as illustrated in the example of 702.

By using the six sets of sub-symmetry as illustrated in the example of 702 instead of using only two sets such as in the example of 606, more image information is utilized in calculating the COS (such as, e.g., the pair of the left and middle ROIs (orders +1 and 0), and the pair of middle and right ROIs (orders 0 and −1) etc., which are not considered when using the two sets illustrated in the example of 606 to calculate the COS), and the image noises caused by different variations can be further averaged and eliminated, thereby resulting in improved stability and accuracy of the obtained COS.

Another example 704 illustrates a pattern comprising nine circle structures. Each circle structure (as a sub-structure of the pattern) is self-symmetric and the circle structures are also symmetric to one another. Nine ROIs (not illustrated in the figure) respectively enclosing the nine circles (or part thereof) can be defined. In some cases, the pattern can be regarded as mirror-symmetric along the central line of the middle circles (e.g., circles 2, 5 and 8). In such cases, circle 1 and circle 3 can form a set of sub-symmetry (as illustrated by a double-arrowed line). Circles 1 and 2, as well as circles 2 and 3, can respectively form a set. In addition, each circle by itself can form a set. Similarly, circles 4-9 can form similar sets accordingly.

Alternatively, the pattern in example 704 can also be regarded as rotation-symmetric, i.e., it is symmetric to its 180-degree rotated pattern. In such cases, circle 1 and circle 9 can form a set of sub-symmetry (as illustrated by a double-arrowed line). Circles 2 and 8, circles 4 and 6, and circles 3 and 7 can respectively form a set. The circles can also each form a set by itself. In some cases, any two circles in the pattern can form a set of sub-symmetry to be included in the possible permutations. The present disclosure is not limited to the number of permutations or the specific way of deriving the multiple sets of sub-symmetry.

It is to be noted that the signal generated for representing the GL distribution of each set of sub-symmetry can be in 1D or 2D form, depending on the specific patterns/structures enclosed in the ROI(s) and the type of symmetry. For instance, in cases of a line structure in a mirror-symmetry (which has a uniform distribution along the axis of symmetry), such as illustrated in FIG. 8, a 1D waveform signal can be extracted along the direction of the axis of symmetry. In cases of a circle structure or a triangle structure in either a mirror-symmetry or rotation-symmetry, a 2D signal is needed for representation of the GL distribution thereof.

Turning now to FIG. 4, there is illustrated a generalized flowchart of refining the identified COS in accordance with certain embodiments of the presently disclosed subject matter.

According to certain embodiments, optionally, upon localizing the first COS, it can be determined whether the first ROIs are centered around the first COS. In response to the first ROIs not centered around the first COS, the first ROIs can be shifted (402) to be centered around the first COS, and the determination of one or more first sets of symmetric sub-structures (as described with reference to block 206 of FIG. 2) and localization of the first COS (as described with reference to block 208 of FIG. 2) can be repeated (404) to obtain an updated first COS.

In the example of FIG. 8, assume the first COS identified for the first structure in image 802 is somehow not in the center of the first ROIs. This may be caused by certain process variations which results in the square structure to be not exactly symmetric as designed. As the initial ROIs are usually predefined based on one or more reference images or design data of the layers, such variations may cause the initial ROIs to be not properly enclosing the structures as expected. For instance, in cases where the right-side line of the square may slightly shift towards the center, the right ROI may only enclose part of the line, thus causing the structures as enclosed in the ROIs to be actually not symmetric, thereby affecting the accuracy of the COS derived under such circumstances.

In such cases, the additional step of determining whether the first ROIs are centered around the first COS can provide verification whether the initial ROIs are in place. If not, they should be adjusted to be centered around the identified COS, and the process of localizing the COS can be repeated, thereby obtaining an updated COS. Similarly, the updated COS can be verified again with respect to the adjusted ROIs, and the process can be repeated again, if needed. Once the process is completed, the updated COS is more accurate as compared to the COS initially identified.

Similarly, upon localizing the second COS, it can be determined whether the second ROIs are centered around the second COS. In response to the second ROIs not centered around the second COS, the second ROIs can be shifted to be centered around the second COS, and the determination of one or more second sets of symmetric sub-structures (as described with reference to block 206 of FIG. 2) and localization of the second COS (as described with reference to block 208 of FIG. 2) can be repeated (404) to obtain an updated second COS.

According to certain embodiments, the overlay measurement process as described above can be part of a runtime examination process. In some cases, it can be included as part of a process for generating a metrology recipe usable by system 101 for performing metrology operations in runtime. Therefore, the presently disclosed subject matter also includes a system and method for generating a metrology recipe as described above.

It is to be noted that examples illustrated in the present disclosure, such as, e.g., the examples of structures and layers, the exemplified ROIs, the exemplified sets of sub-symmetry, etc., are illustrated for exemplary purposes, and should not be regarded as limiting the present disclosure in any way. Other appropriate examples/implementations can be used in addition to, or in lieu of the above.

Among advantages of certain embodiments of the metrology system as described herein is that it provides an overlay measurement with improved stability and accuracy. This is enabled at least by first identifying the number of sets of sub-symmetry (i.e., symmetric sub-structures) in the structures enclosed by the ROIs, and separately localizing a COS for each set of sub-symmetry. The final COS of the entire structures is derived based on the COS of each set (e.g., by averaging the COSs of respective sets).

The performance of the measurement can be further enhanced by determining whether the ROIs are centered around the identified COS. As described above, this can provide verification as whether the initial ROIs are in place, and provide an opportunity to adjust the ROIs to be centered around the identified COS and repeat the process of localizing the COS, thereby obtaining an updated COS with improved accuracy.

Among further advantages of certain embodiments of the metrology system as described herein, is that the ROIs used herein are selected in an attempt to separate between the part of first structure enclosed in the first ROIs and the part of second structure enclosed in the second ROIs. Such selection can enable separation of signals representing different structures from different layers, thus avoiding interference when localizing the COSs. The ROIs are also selected taking into consideration the possible process variations that may occur to the first/second structures in order to improve the accuracy of the COS identification.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system of determining an overlay measurement between a first layer and a second layer of a semiconductor specimen, the system comprising:
   an examination tool configured to acquire a first image of a first structure on the first layer and a second image of a second structure on the second layer; and
   a processing and memory circuitry (PMC) operatively coupled to the examination tool, and configured to:
      select one or more first regions of interest (ROIs) enclosing at least part of the first structure in the first image and one or more second ROIs enclosing at least part of the second structure in the second image;
      identify one or more first sets of symmetric sub-structures in the at least part of the first structure based on the first ROIs and one or more second sets of symmetric sub-structures in the at least part of the second structure based on the second ROIs;
      localize a first center of symmetry (COS) of the first structure based on a COS identified for each first set of symmetric sub-structure, and localize a second COS of the second structure based on a COS identified for each second set of symmetric sub-structure, wherein the first COS is localized by generating a first signal representative of gray level (GL) distribution of each first set of symmetric sub-structures, symmetrically rotate the first signal to obtain a symmetrically rotated signal, identifying the COS for each first set of symmetric sub-structures based on a correlation between the first signal and the symmetrically rotated signal, and combining the COS identified for each of the one or more first sets to obtain the first COS; and
      determine the overlay measurement based on a difference between the first COS and the second COS.

2. The computerized system according to claim 1, wherein the examination tool is an electron beam tool configured to acquire the first image and the second image as different images by respective detectors of the electron beam tool, and wherein the first image is a secondary electron (SE) image, and the second image is a backscattered electron (BSE) image.

3. The computerized system according to claim 1, wherein the examination tool is an optical metrology tool configured to acquire the first image and the second image as different images with different optical configurations.

4. The computerized system according to claim 1, wherein the first ROIs and second ROIs are selected to avoid interference between the at least part of the first structure enclosed in the first ROIs and the at least part of the second structure enclosed in the second ROIs, based on expected process variations with respect to the at least part of the first structure or the at least part of the second structure.

5. The computerized system according to claim 1, wherein at least one of the one or more first sets of symmetric sub-structures or the one or more second sets of symmetric sub-structures comprises a plurality of sets of symmetric sub-structures, and wherein the PMC is configured to identify a plurality of COSs for the plurality of sets of symmetric sub-structures, and combine the plurality of COSs.

6. The computerized system according to claim 1, wherein the one or more first sets of symmetric sub-structures are identified based on one or more characteristics of the first ROIs including: shape, position, size, and number of the first ROIs, and a type of symmetry between the first ROIs.

7. The computerized system according to claim 1, wherein in cases where the at least part of the first structure comprises a plurality of sub-structures each being self-symmetric and symmetric to one another, the one or more first sets comprises multiple first sets of symmetric sub-structures, each set corresponding to a respective permutation of a pair of two sub-structures, and wherein the PMC is configured to identify multiple COSs for the multiple first sets of symmetric sub-structures, and combine the multiple COSs to obtain the first COS of the first structure.

8. The computerized system according to claim 1, wherein the correlation is obtained by performing cross correlation between the first signal and the symmetrically rotated signal by moving the symmetrically rotated signal relative to the first signal, and wherein the COS for each first set is identified at a position having a strongest correlation between the first signal and the symmetrically rotated signal.

9. The computerized system according to claim 1, wherein the PMC is configured to localize the second COS of the second structure by:
   generating a second signal representative of gray level (GL) distribution of each second set of symmetric sub-structures;
   identifying the COS for each second set of symmetric sub-structures based on a correlation between the second signal and a symmetrically rotated signal of the second signal; and
   combining the COS identified for each of the one or more second sets to obtain the second COS of the second structure.

10. The computerized system according to claim 1, wherein upon localizing the first COS, the PMC is further configured to, in response to the first ROIs not centered around the first COS, shift the first ROIs to be centered around the first COS, and repeat the identifying one or more first sets and localizing the first COS to obtain an updated first COS.

11. The computerized system according to claim 1, wherein the first structure and the second structure comprise at least one of a mirror-symmetric pattern or a rotation-symmetric pattern, and wherein the PMC is configured to identify the one or more first sets of symmetric sub-structures based on type of symmetry of the first structure and identify one or more second sets of symmetric sub-structures based on type of symmetry of the second structure.

12. A computerized method of determining an overlay measurement between a first layer and a second layer of a semiconductor specimen, the method comprising:
   acquiring, by an examination tool, a first image of a first structure on the first layer and a second image of a second structure on the second layer;
   selecting, by a processing and memory circuitry (PMC) operatively coupled to the examination tool, one or more first regions of interest (ROIs) enclosing at least part of the first structure in the first image and one or more second ROIs enclosing at least part of the second structure in the second image;
   identifying, by the PMC, one or more first sets of symmetric sub-structures in the at least part of the first structure based on the first ROIs and one or more second sets of symmetric sub-structures in the at least part of the second structure based on the second ROIs;
   localizing, by the PMC, a first center of symmetry (COS) of the first structure based on a COS identified for each first set of symmetric sub-structure, and localizing a second COS of the second structure based on a COS identified for each second set of symmetric sub-structure, wherein the first COS is localized by generating a first signal representative of gray level (GL) distribution of each first set of symmetric sub-structures, symmetrically rotate the first signal to obtain a symmetrically rotated signal, identifying the COS for each first set of symmetric sub-structures based on a correlation between the first signal and the symmetrically rotated signal, and combining the COS identified for each of the one or more first sets to obtain the first COS; and determining, by the PMC, the overlay measurement based on a difference between the first COS and the second COS.

13. The computerized method according to claim 12, wherein the examination tool is an electron beam tool, and the first image and the second image are different images acquired by respective detectors of the electron beam tool, and wherein the first image is a secondary electron (SE) image, and the second image is a backscattered electron (BSE) image.

14. The computerized method according to claim 12, wherein the first ROIs and second ROIs are selected to avoid interference between the at least part of the first structure enclosed in the first ROIs and the at least part of the second structure enclosed in the second ROIs, based on expected process variations with respect to the at least part of the first structure or the at least part of the second structure.

15. The computerized method according to claim 12, wherein the one or more first sets of symmetric sub-structures are identified based on one or more characteristics of the first ROIs including: shape, position, size, and number of the first ROIs, and a type of symmetry between the first ROIs.

16. The computerized method according to claim 12, wherein upon localizing the first COS, the PMC is further configured to, in response to the first ROIs not centered around the first COS, shift the first ROIs to be centered around the first COS, and repeat the identifying one or more first sets and localizing the first COS to obtain an updated first COS.

17. The computerized method according to claim 12, wherein the first image and the second image are a same image representative of both the first structure and the second structure.

18. A non-transitory computer readable storage medium tangibly embodying a program of instructions that, when executed by a computer, cause the computer to perform a method of determining an overlay measurement between a first layer and a second layer of a semiconductor specimen, the method comprising:

acquiring, by an examination tool, a first image of a first structure on the first layer and a second image of a second structure on the second layer;

selecting, by a processing and memory circuitry (PMC) operatively coupled to the examination tool, one or more first regions of interest (ROIs) enclosing at least part of the first structure in the first image and one or more second ROIs enclosing at least part of the second structure in the second image;

identifying, by the PMC, one or more first sets of symmetric sub-structures in the at least part of the first structure based on the first ROIs and one or more second sets of symmetric sub-structures in the at least part of the second structure based on the second ROIs;

localizing, by the PMC, a first center of symmetry (COS) of the first structure based on a COS identified for each first set of symmetric sub-structure, and localizing a second COS of the second structure based on a COS identified for each second set of symmetric sub-structure, wherein the first COS is localized by generating a first signal representative of gray level (GL) distribution of each first set of symmetric sub-structures, symmetrically rotate the first signal to obtain a symmetrically rotated signal, identifying the COS for each first set of symmetric sub-structures based on a correlation between the first signal and the symmetrically rotated signal, and combining the COS identified for each of the one or more first sets to obtain the first COS; and determining, by the PMC, the overlay measurement based on a difference between the first COS and the second COS.

* * * * *